Sept. 12, 1933.  W. DE WRANGEL ET AL  1,926,971
TRANSMISSION FOR ELECTRICALLY DRIVEN TALKING MACHINES
Filed April 4, 1928   2 Sheets-Sheet 2

W. de Wrangel
and L. Saharoff
INVENTORS

By Marks & Clerk
Attys.

Patented Sept. 12, 1933

1,926,971

UNITED STATES PATENT OFFICE 1,926,971

TRANSMISSION FOR ELECTRICALLY DRIVEN TALKING MACHINES

Wladimir de Wrangel and Léon Saharoff, Paris, France; said Saharoff assignor to said de Wrangel Application April 4, 1928, Serial No. 267,400, and in France August 18, 1927

3 Claims. (Cl. 308—11)

Control devices for talking machines are already known wherein the turntable shaft is driven directly or through a suitable transmission, by an electric motor rotating at a great speed. But such control devices do not allow the movement of the record to be properly regulated and do not provide for an efficient absorption of the shocks transmitted by the motor to the frame; the vibrations of the metallic parts, due to the rotation of the motor, generally cause noises to arise which are liable to alter the clearness of the sound reproduced by the talking machine.

To remove this drawback it has been proposed heretofore to secure the motor to damping hangers borne by the top plate of the frame. Experience has proven such contrivances to be inadequate as they do not provide for all the conditions required for obtaining a silent and regular movement.

In order that the talking machine may work under perfectly satisfactory conditions and especially that the record may rotate with perfect regularity it is necessary to ensure a perfect acoustic insulation of the motor with reference to the frame, and a perfectly steady securing of the motor to the said frame and to provide for easily and efficiently adjusting the tension of the transmission belt.

The steady securing of the motor shows also the auxiliary advantage of allowing the transportation of the machine from one place to another without any danger of altering the relative position of the parts and the initial adjustment.

Our invention has for its object a transmission for electrically driven talking machines responding to the above conditions. According to our invention a perfect adjustment is ensured by mounting the regulator on a shaft distinct from the one which transmits the movement from the motor to the turntable shaft. Thus its action is similar whether the irregularities to be suppressed are due to the motor or to the record. The damping of the vibrations of the motor and the suppression of the troublesome noises due thereto are ensured according to our invention by means compatible with the reliable securing of the motor. In view of avoiding any metallic contact between the motor and the frame the parts securing the motor on the said frame are protected with rubber or any other similar material adapted to damp the sound and the vibrations.

On appended drawings we have shown merely by way of example and in an entirely diagrammatical manner a form of execution of our invention.

Figure 1:
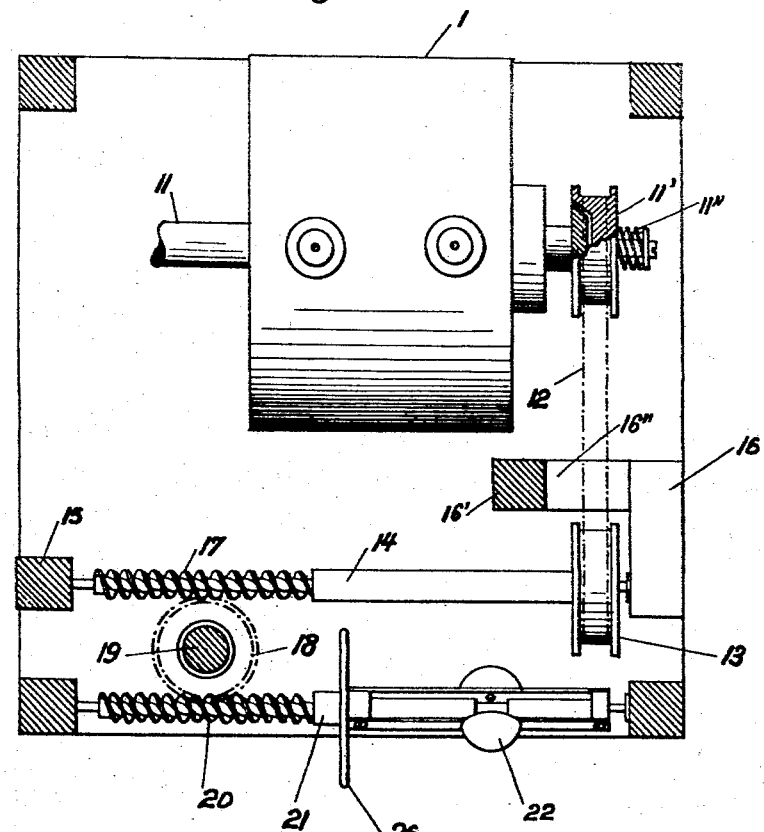
Fig. 1 is a plan view of the control device, the top plate of the frame being removed.
Figure 3:
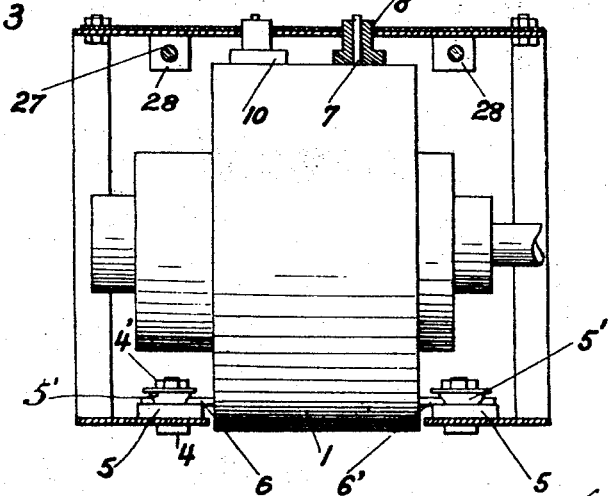
Fig. 3 is a rear view of the device showing the manner of securing the motor to the top and lower plates of the frame.

The control device comprises an electric motor 1 of any suitable known type secured through suitable means to the lower plate 2 and to the upper plate 3 of the frame. In the form shown these securing means are constituted by the following members secured to the lower part of the motor casing: two lateral projections 6, 6' secured to the motor casing are each held by a unit comprising a screw 4, a nut 4', the rubber plugs 5—5. Each screw has preferably a longitudinal flattened portion for the passage of the fork of the projection 6 or 6'. Each projection is held between the rubber plugs 5, and the conical members 5' forming a part of the plugs. The plugs 5 and members 5' are clamped together by means of the nut 4' and thus secure the projections therebetween. A slight displacement of the motor will be effected by a displacement of the upper plate hereinafter described. This displacement of the motor is rendered possible by the mounting of the projections 6, 6' which usually permits a slight rotation of the motor around the projections. A certain number of studs 7 (two in the example shown), secured to the top of the casing, are inserted in suitable apertures 8 of a metal plate 9, adjustably secured on the top plate of the frame; between the studs 7 and the walls of the aperture 8 are secured sockets 10 also made of rubber or any other suitable material adapted to damp the vibrations.

The shaft 11 of the electric motor 1 bears at one of its ends a pulley 11' which through a transmission belt 12 drives the pulley 13 keyed to a shaft 14 parallel to shaft 11. The pulley 11' is freely mounted on shaft 11, and may rotate with it under the action of a suitable friction clutch 11" which allows it to rotate with reference to this shaft in case of a sudden change of speed of either the shaft or pulley.

Figure 2:
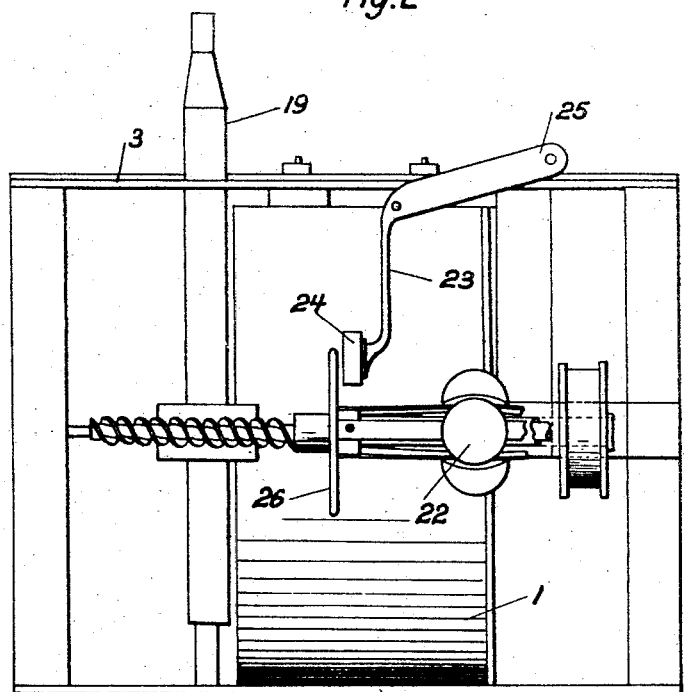
Fig. 2 is a side view partially sectional.

The end of the shaft 14 pivots in brackets provided in the supports 15 and 16 secured to the top plate 3 of the frame (Figs. 1 and 2); the support 16 is borne by two projecting parts 16' and 16" disposed in two perpendicular planes (horizontal and vertical) so as not to interfere with the mounting of the belt 12 on the transmission pulley 13. The above mentioned shaft 14 is provided moreover with a worm 17 meshing in the usual manner with a worm wheel 18 keyed to the vertical turntable shaft 19. The said worm wheel meshes on the other hand with the worm 20 formed on the horizontal shaft 21 bearing a regulator 22 of any suitable kind. By means of this arrangement of the regulator 22 on a shaft distinct from the one transmitting the movement to the turntable shaft, we obtain an absolutely perfect regulation.

The control device described hereinabove comprises on its front part a brake 23 provided with a damper 24 coacting with the friction plate 26 of the regulator and controlled by the lever 25.

Figure 4:
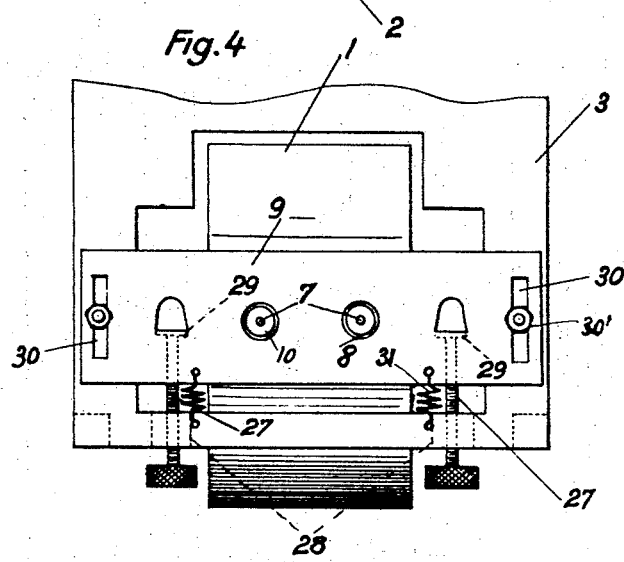
Fig. 4 is a plan view of the frame showing the means for suitably adjusting the tension of the belt.

The adjustment of the tension of the belt 12 is ensured by the means shown on Fig. 4. These means comprise the screws 27 mounted on a stationary supporting square 28 secured to the top plate of the frame, the inner end of these screws abutting against small vertical plates 29 formed in the adjustable plate 9. Moreover slots 30 are provided in the metal plate 9 disposed over the top plate 3, which allow the motor to be firmly held by the engagement of screws in the said slots after its distance to the turntable shaft has been adjusted through the screws 27.

It should be well understood that the above described device is illustrated only by way of example and that detail modifications may be brought to it without thereby enlarging the scope of the invention.

Thus the above mentioned slots 30 may be provided either on the top plate or on the lower plate or simultaneously on both plates together. We may complete the device for tensioning the belt by springs 31 or any other device for bringing back the small plate 9, to its original position.

By unscrewing the screws 27 more or less, the springs 31 are adapted to draw the plate 9 toward the edge of the frame and to carry the plugs 8 along with the plate, whereby the motor turns slightly around the projections 6, 6'. There will result therefrom an increase of the tension of the belt. In practice, the tension of the plate is regulated so as to damp troublesome noises, and when this regulation is effected, the motor is stopped in this position by tightening the screws 30'.

What we claim is:

1. An elastic mounting for a phonograph motor to regulate the tension of the drive belt comprising a frame, a plate slidably supported by the frame, elastic abutments extending into the plate, studs carried by the motor casing and engaged in the abutments, projections carried by the motor casing, clamping bolts connecting the frame and projections, elastic members engaged on the bolts and interposed between the frame and projections, and means for slidably adjusting the plate.

2. An elastic mounting for a phonograph motor to regulate the tension of the drive belt comprising a frame, a plate slidable on the frame, cylindrical elastic abutments engaged with the plate, a pair of studs fixed to the upper part of the motor casing and alined parallel with the motor shaft, horizontally disposed projections alined parallel with the motor shaft, bolts carried by the frame and engaged with the projections, elastic members engaged on the bolts and interposed between the projections and frame, springs connecting the frame and plate, and means for adjusting the plate in opposition to the spring.

3. An elastic mounting for a phonograph motor to regulate the tension of the drive belt, comprising a frame including upper and lower plates, a pair of vertical studs secured to the upper part of the motor casing and alined parallel with the motor shaft, a horizontal plate slidable relatively to the upper plate and having apertures therein, elastic abutments mounted on the studs for engagement in the apertures, projections carried by the motor casing, clamping bolts connecting the projections and lower plate of the frame, elastic washers on the clamping bolts and interposed between the projections and lower plate, and means for adjusting the horizontal plate to regulate the tension of the belt.

WLADIMIR DE WRANGEL.
LÉON SAHAROFF.